Sept. 24, 1963 T. J. O'DONNELL 3,104,523
RIGID CELLULAR PROPELLENT SUPPORTS
Filed Oct. 1, 1959 2 Sheets-Sheet 1
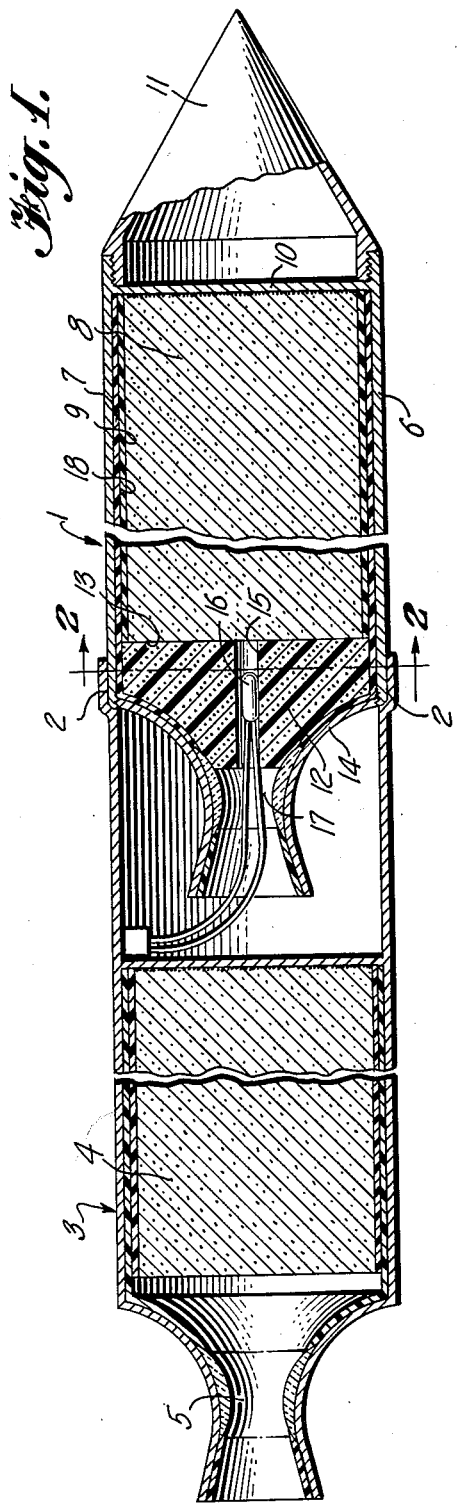
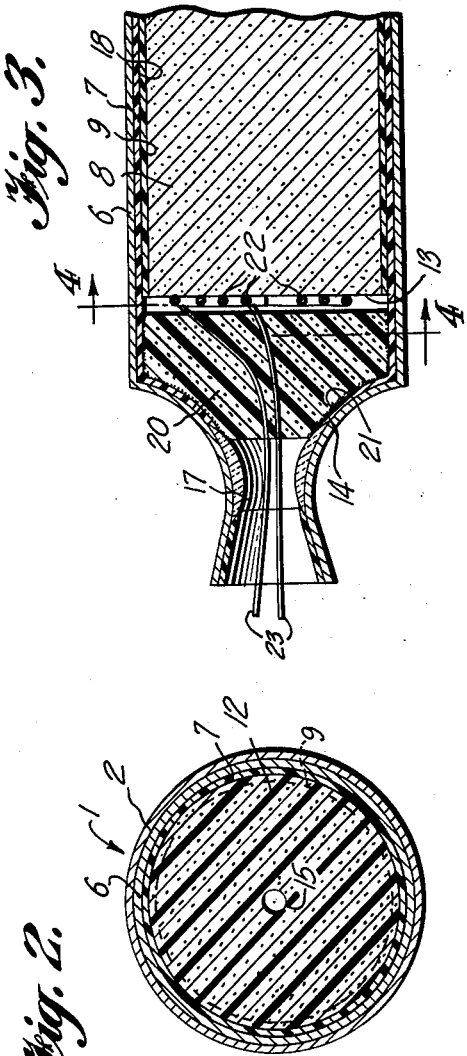
INVENTOR
Thomas J. O'Donnell
BY Martha L. Ross
AGENT

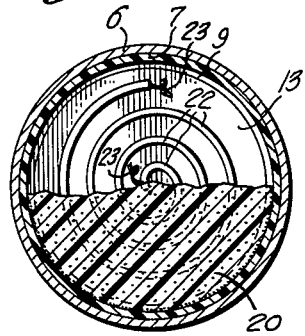
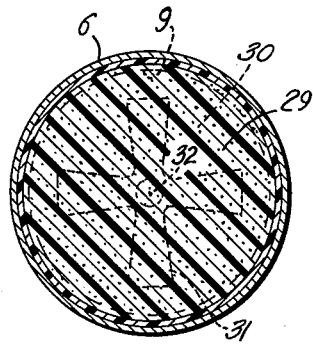
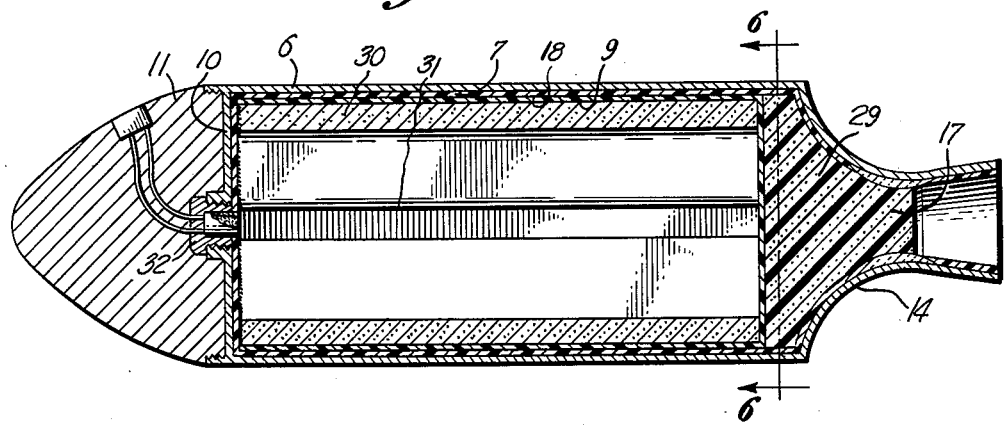
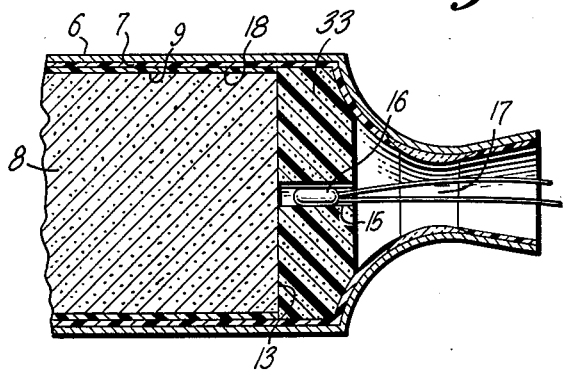

United States Patent Office 3,104,523
Patented Sept. 24, 1963

3,104,523
RIGID CELLULAR PROPELLENT SUPPORTS
Thomas J. O'Donnell, McLean, Va., assignor to Atlantic Research Corporation, a corporation of Virginia
Filed Oct. 1, 1959, Ser. No. 843,890
12 Claims. (Cl. 60—35.6)

This invention relates to new and improved rocket propellent grain supports to prevent shifting of the grain in the motor casing due to the inertia of its mass during a period of high acceleration prior to ignition of the grain.

In many instances a rocket assembly is subjected to high accelerative stresses prior to ignition of the propellent grain within its own motor. This is true, for example, of rocket projectiles or vehicles which are launched with the aid of a booster such as a propellent charge in a stationary launcher or in another rocket. Another case in point is a boosted rocket motor which in turn serves to accelerate still another rocket motor stage.

Under high accelerative conditions, the propellent grain is subject to set-back forces because of the inertia of its mass, which tend to cause rearward shifting of the grain. After ignition of the grain, this is generally adequately counterbalanced by the pressure of the combustion gases where the grain is an end-burning grain with burning taking place on its rearward face or where the front end of the grain is bonded to the forward end of the motor casing. An unignited grain, under high acceleration is likely to shift rearwardly with such great impactive force against the rear wall of the motor as to cause it to fracture and even to eject partially out of the motor nozzle. Even where the forward end of the grain is bonded to the front wall of the motor, the set-back force can cause fracturing of the grain.

Restraints such as metal grids interposed between the rear end of the grain and the rocket motor nozzle have been proposed. These, however, have the disadvantage of interfering with the free flow of the gases. Restraining shoulders projecting from the wall of the motor casing and engaging the rear end of the rocket along its periphery do not solve the problem since they do not provide the necessary support for the central portions of the grain.

Another disadvantage of such expedients is that the high accelerative loads on the grain must be absorbed and distributed over the relatively small surface area of the grid or shoulder. The counterbalancing force is thus concentrated on just a portion of the grain with resulting shearing stresses within the body of propellant which can cause fracturing.

The object of this invention is to provide an improved rigid support for a propellent grain, the support being positioned between the rear end of the grain and the rear wall of the rocket motor casing.

Another object is to provide a support which extends across the entire or substantially the entire rear face of the propellent grain so that accelerative loads on the grain are distributed over a large surface area and unevenness of counterbalacing forces on supported and unsupported portions of the grain which may cause shearing stresses is eliminated.

Another object is to provide such a support which, after ignition of the propellent grain, disintegrates or is consumed so that it does not interfere with the free flow of the thrust-producing combustion gases.

Still another object is to provide a propellent grain support which, while of adequate strength to hold and cushion the grain against high accelerative stresses, is exceedingly light in weight, thereby minimizing dead load.

Another object is to provide a propellent grain support which can also function as an effective seal to protect the grain from air and moisture.

Other objects and advantages will appear from the following detailed description of the invention and from the drawings in which:

FIGURE 1 is a longitudinal cross-sectional view through a diagrammatic embodiment of the invention.

FIGURE 2 is a transverse cross-sectional view along lines 2—2 of FIGURE 1.

FIGURE 3 is a fragmentary longitudinal cross-sectional view of a modification.

FIGURE 4 is a transverse cross-sectional view along lines 4—4 of FIGURE 3.

FIGURE 5 is a longitudinal cross-section of still another modification.

FIGURE 6 is a transverse cross-section along lines 6—6 of FIGURE 5.

FIGURE 7 is a fragmentary longitudinal cross-section of another modification.

The propellent grain support of this invention is a rigid body interposed between the rear end of the grain and the rear wall of the motor casing, preferably including the nozzle, and is made of a cellular material which disintegrates or shatters under the impact of the high pressure combustion gases after ignition of the propellant into fragments which vent out the nozzle together with the high velocity combustion gases leaving the space rearward of the burning grain unencumbered. Such cellular materials include, for example, foamed glass and other thin-walled porous ceramics, foamed metals, such as foamed aluminum, foamed organic plastics, and the like. In general, I prefer to employ the foamed organic plastics, since in addition to shattering, they also melt or decompose into gaseous products at the high temperature of the combustion gases. The rigid cellular bodies have the further advantage of being exceedingly light in weight while being sufficiently strong to support the grain against high accelerative stresses.

Since the rigid cellular structure disintegrates and is removed from the combustion zone, it can be disposed across the entire or substantially the entire rear surface area of the grain and, in fact, can fill the entire space between the rear face of the grain and the rear motor wall. The accelerative load can thus be distributed over a surface area as large or substantially as large as that of the rear end of the grain. By providing such support for the entire or substantially the entire grain, shearing stresses within the grain are eliminated. In some cases, it may be necessary to provide a small longitudinal perforation in the support for insertion of an igniter. The reduction in energy-absorptive surface area produced by this expedient is so small as to be negligible in effect.

The rigid, cellular structure, particularly the foamed organic plastics, lends itself to a wide variety of shaping design depending on particular applications and requirements. Preferably it is shaped to conform to and fill cross-wise the space between the rear end of the grain and the rear wall of the motor casing, with an annular perforation provided in the support, if necessary for insertion of an igniter. The rear face of the support is preferably shaped so as to be in mating engagement with at least a portion of and preferably all of the rear motor wall and the front face so as to be parallel to the rear face of the grain. Such a configuration provides the maximum of support for the grain since it extends over substantially the entire rear end of the grain. The rigid cellular structure can also fill the entire distance lengthwise, namely from front to rear between the end of the grain and the rear motor wall, in which case the support does not need to be bonded to the wall of the motor. Alternatively the front end of the support can be spaced from the rear end of the propellent grain to provide space, where this is considered desirable, for thermal expansion of the grain under environmental conditions of storage. In such case, the support structure is preferably bonded to the wall of the motor to keep it in position. The rigid, cellular structures absorb impact energies to such a high degree, that they will cushion the shock produced by motion of the propellent grain under accelerative stress rearwardly through the space between it and the grain and thereby protect the grain against damage.

As aforementioned a longitudinal perforation can be provided in the support for insertion of an igniter, such as an electrical squib, to permit ignition of the propellent grain. Electrical lead wires can also be embedded in the cellular material of the support and connected to an igniter interiorly positioned in a perforated propellent grain or placed in contact with the rear ignition surface of an end burning grain. Such embedding can be done particularly readily with a foamed plastic during foaming of the material. In the case of interiorly burning grains, the igniter is sometimes positioned at the forward end. In such instance, no provision needs to be made for providing an igniter means through the foamed plastic support.

Any rigid, cellular material which disintegrates under the impact of the high pressure, high temperature combustion gases, such as foamed glass and foamed aluminum, can be employed for my purpose. As aforementioned, I prefer to employ foamed organic plastics. Such rigid foamed plastics are well known in the art and include, for example, foamed polyurethanes, foamed polystyrene, foamed polyethylene, and the foamed vinyl polymers, such as polyvinyl chloride. The density and compressive strength of the foamed plastic can be varied to meet the requirements of any given application. The foamed structure can be open or closed celled. Where the support is also to function as a seal to protect the grain from the atmosphere, the cells should, of course, be closed.

The cellular support structure can be cast in a suitably shaped mold or machined to shape and then inserted into the motor. In the case of the organic plastics, it can also be made by foaming it in place in the motor after insertion of the propellent grain. This can be accomplished by pouring the reacting components, such as a mixture of a polyol, a polyisocyanate and water to produce a foamed polyurethane, into the rear end of the motor through the motor nozzle. The mixture then foams and cures directly in place, forming a structure which fills the space between the rear end of the grain and the rear wall of the motor. Care needs to be taken that the reaction mixtures does not produce such an excessive exotherm as to cause charring or ignition of the propellant. This can readily be avoided by proper formulation of the foaming composition. In some cases, it may be desirable to interpose a plastic liner, such as a film of polyethylene, polyvinyl chloride, nylon, or the like, between the propellent grain and the foaming composition to prevent bonding of the foamed plastic to the end of the propellent grain which would inhibit ignition of the grain.

Referring now to the drawings.

FIGURES 1 and 2 show a rocket motor assembly 1, which is disengageably attached at 2 to booster rocket 3, shown diagrammatically, containing propellent grain 4, which, upon ignition, produces combustion gases which vent through restricted nozzle 5 at high velocity to produce thrust and to propel the entire projectile at a high rate of acceleration.

Rocket assembly 1 comprises combustion chamber 18 formed by rocket motor casing 6, lined with insulation 7 and containing seated therein an end-burning solid propellent grain 8, the sides of which are inhibited against ignition by inhibitor coating 9. The propellent grain is bonded to forward wall 10 of the rocket motor by a plastic cement bonding which also functions as an inhibitor against ignition of the grain at this point. Forward of the rocket motor is payload 11. Foamed organic plastic structure 12 fills the space between the rear face 13 of the propellent grain and rear wall 14 of the motor casing except for longitudinally disposed aperture 15 provided for insertion of squib igniter 16. As shown, the foamed plastic support terminates in the nozzle 17 at a point just forward of its most restricted throat portion. There is nothing critical in this. The support can terminate further forward or can even fill the entire nozzle.

FIGURES 3 and 4 show a modification in which foamed plastic support 20 is spaced rearwardly a short distance from the rear face 13 of propellent grain 8 to provide for thermal expansion of the grain, and is in bonded, mating contact with the rear wall 14 of the motor casing. Bonding can be obtained by means of a plastic cement 21. Ignition here is produced by a spiral 22 of igniter-coated resistance wire. The electrical wire leads 23 are embedded in the foamed plastic support so that no aperture is necessary. The embedding of the lead wires can be accomplished by foaming the plastic directly around them.

FIGURES 5 and 6 show still another modification in which an internally burning grain having a cruciform perforation 31 is ignited from the forward end by igniter 32 so that no provision needs to be made for an igniter at the rear, nozzle end of the motor.

Support configurations, such as those shown in FIGURES 3 and 5, which extend entirely across the rear end of the motor without perforation, when made of a closed-pore, foamed plastic, function very effectively as a seal against access to the propellent grain by atmospheric oxygen and moisture which might adversely affect it.

Although the rear face of the support is preferably in mating alignment with substantially the entire rear wall of the rocket motor since this provides maximum support for the cellular structure, this is not essential so long as the rear face abuts or is bonded to at least a portion of the rear wall to prevent shifting of the support. Such a modified support 33 is illustrated in FIGURE 7.

In some instances, the propellant grain may be spaced from the motor chamber side wall, as in the case of a centrally perforated grain which is designed to burn outwardly from the surface of the perforation and inwardly from its peripheral side surface. Here the rigid, cellular support needs only to extend, in its transverse dimensions, across the surface area of the rear end of the grain to provide complete support.

Although the embodiments aforedescribed illustrate rocket motors containing single end- and internally-burning grains, it will be understood that the support is similarly effective where a plurality of grains are longitudinally disposed in a rocket motor.

Although this invention has been described with reference to illustrative embodiments thereof, it will be apparent to those skilled in the art that the principles of this invention can be embodied in other forms but within the scope of the appended claims.

I claim:

1. In a rocket motor comprising a combustion chamber having a rear wall and containing seated therein a propellant grain designed to burn progressively from an initial ignition surface, said chamber being provided rearwardly with a restricted nozzle, a rigid cellular body, which is capable of disintegrating under the impact of the high pressure, high temperature combustion gases after ignition of said propellant grain, positioned between the rear face of said grain and the rear wall of said combustion chamber, the forward face of said cellular body being parallel with said rear face of said grain and the rear face of said cellular body abutting at least a portion of said rear wall of said combustion chamber, said cellular body extending in its transverse dimensions across substantially the entire surface area of the propellant grain and being substantially larger in its transverse dimensions than the throat of said nozzle, said cellular body functioning as a support for said grain.

2. The rocket motor of claim 1 in which the rigid cellular body extends, in its transverse dimensions, across the entire interior cross-sectional area of the combustion chamber.

3. The rocket motor of claim 2 in which the rigid cellular body is a closed cell structure.

4. In a rocket motor comprising a combustion chamber having a rear wall and containing seated therein a propellant grain designed to burn progressively from an initial ignition surface, said chamber being provided rearwardly with a restricted nozzle, a rigid foamed organic plastic body positioned between the rear face of said grain and the rear wall of said combustion chamber, the forward face of said foamed organic plastic body being parallel with said rear face of said grain and the rear face of said foamed organic plastic body abutting at least a portion of said rear wall of said combustion chamber, said foamed organic plastic body extending in its transverse dimensions across substantially the entire surface area of the rear face of said propellant grain and being substantially larger in its transverse dimensions than the throat of said nozzle, said foamed organic plastic body functioning as a support for said grain.

5. The rocket motor of claim 4 in which the forward face of the foamed organic plastic body abuts the rear face of the propellant grain.

6. The rocket motor of claim 4 in which the forward face of the foamed organic plastic body is spaced from the rear face of the propellant grain to provide for thermal expansion of said grain.

7. The rocket motor of claim 4 in which the foamed organic plastic body is provided with a longitudinal channel of relatively small diameter to provide for insertion of an igniter.

8. The rocket motor of claim 4, in which the foamed organic plastic body extends, in its transverse dimensions, across the entire interior cross-sectional area of the combustion chamber.

9. The rocket motor of claim 5 in which the foamed organic plastic body extends, in its transverse dimensions, across the entire interior cross-sectional area of the combustion chamber.

10. The rocket motor of claim 6 in which the foamed organic plastic body extends, in its transverse dimensions, across the entire interior cross-sectional area of the combustion chamber.

11. The rocket motor of claim 7 in which the foamed organic plastic body extends, in its transverse dimensions, across the entire interior cross-sectional area of the combustion chamber.

12. The rocket motor of claim 8 in which the foamed organic plastic body is a closed cell structure.

References Cited in the file of this patent

UNITED STATES PATENTS

| | | |
|---|---|---|
| 2,720,749 | Beebe | Oct. 18, 1955 |
| 2,776,623 | Bonner | Jan. 8, 1957 |
| 2,875,577 | Odenkirchen | Mar. 3, 1959 |
| 2,923,126 | Precoul | Feb. 2, 1960 |
| 2,939,275 | Loedding | June 7, 1960 |

OTHER REFERENCES

Modern Plastics Publication, vol. 32, No. 12, Aug. 1955, pages 102–104, 212, 213, 215.

Rubber World Publication, vol. 132, No. 6, Sept. 1955, pages 753–757.